No. 677,245.  
A. F. MADDEN.  
APPARATUS FOR MAKING SECONDARY BATTERY PLATES.  
(Application filed Mar. 19, 1901.)  
Patented June 25, 1901.

(No Model.) 3 Sheets—Sheet 1.

WITNESSES:
Dom Twitchell
Albert J. Doty

INVENTOR
Albert F. Madden,
BY Alvin K. Goodwin
ATTORNEY

No. 677,245. Patented June 25, 1901.
A. F. MADDEN.
APPARATUS FOR MAKING SECONDARY BATTERY PLATES.
(Application filed Mar. 19, 1901.)
(No Model.) 3 Sheets—Sheet 2.
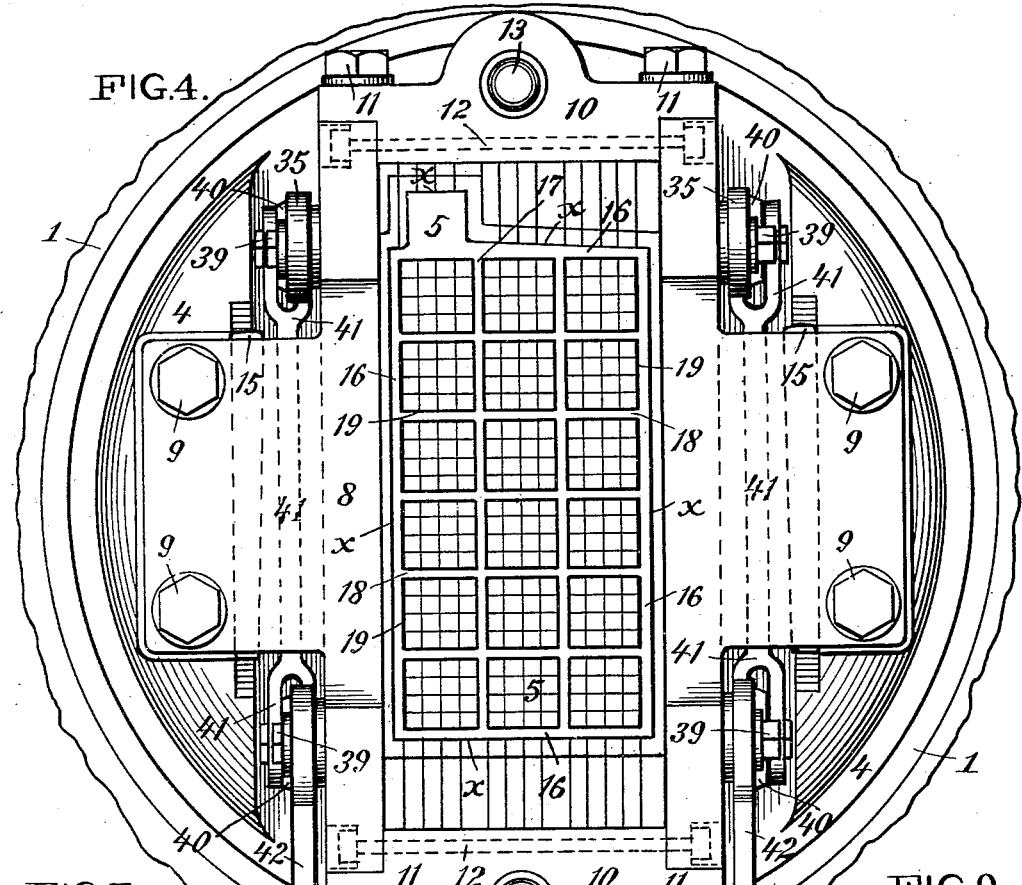
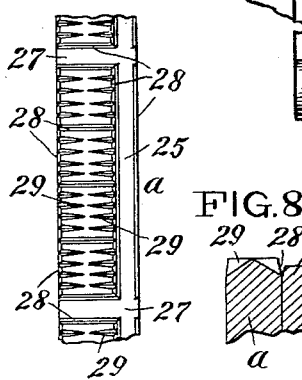
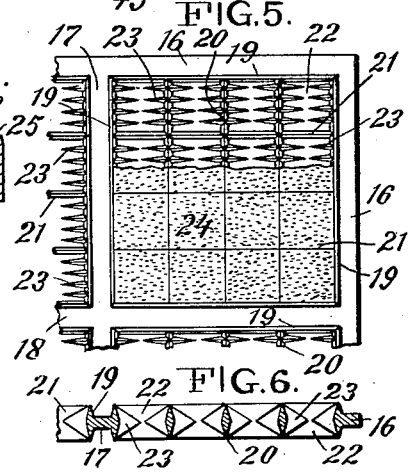
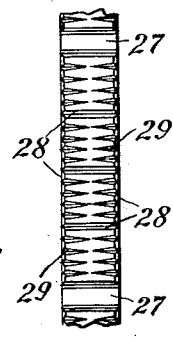
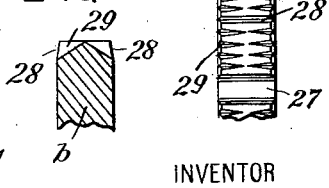
WITNESSES:
Donn Twitchell
Albert J. Doty
INVENTOR
Albert F. Madden,
BY Alvin K. Goodwin
ATTORNEY
THE NORRIS PETERS CO., PHOTO-LITHO., WASHINGTON, D. C.

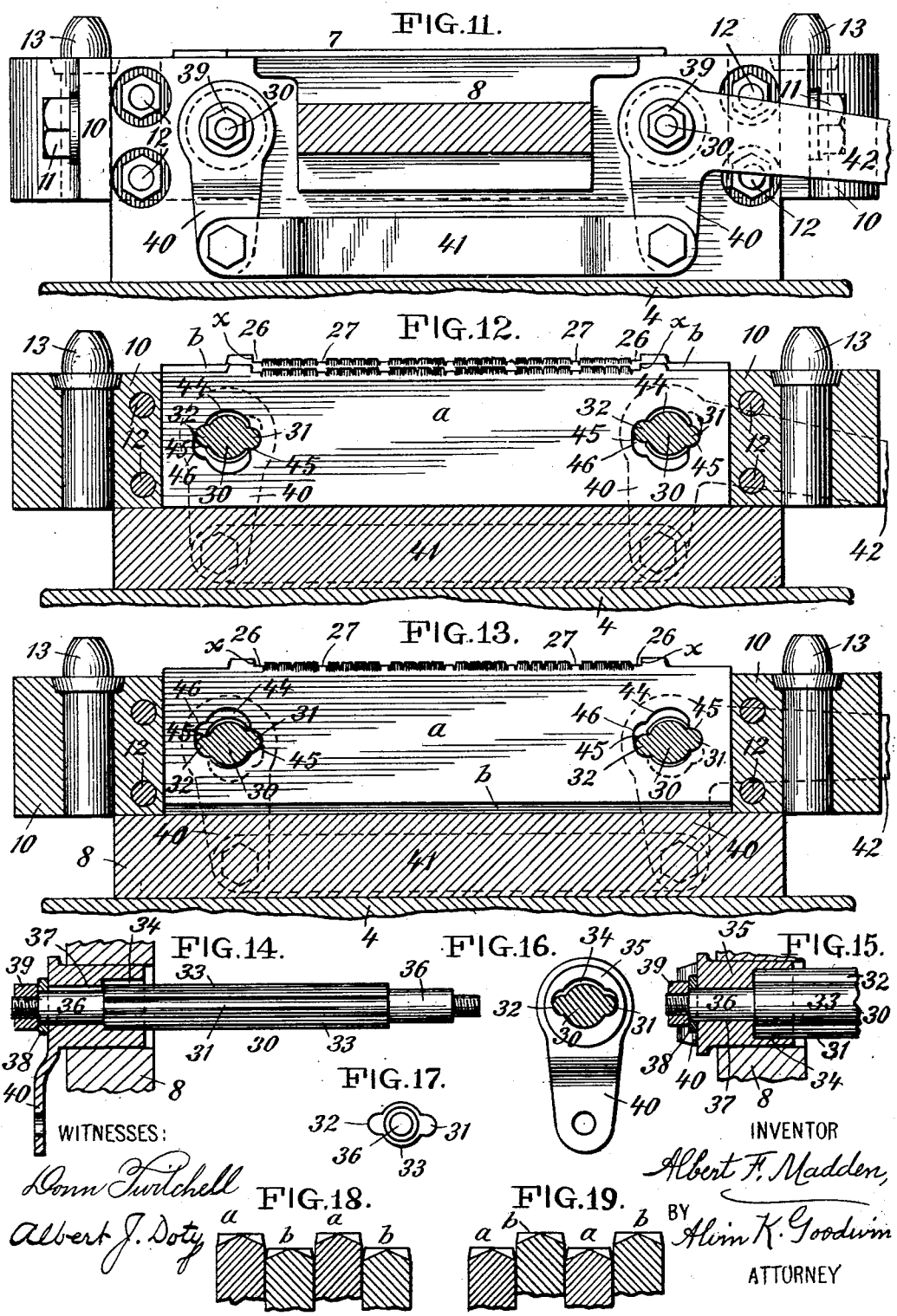

UNITED STATES PATENT OFFICE.

ALBERT FRANKLIN MADDEN, OF NEWARK, NEW JERSEY.

APPARATUS FOR MAKING SECONDARY-BATTERY PLATES.

SPECIFICATION forming part of Letters Patent No. 677,245, dated June 25, 1901.

Application filed March 19, 1901. Serial No. 51,867. (No model.)

*To all whom it may concern:*

Be it known that I, ALBERT FRANKLIN MADDEN, a citizen of the United States of America, residing at the city of Newark, in the county of Essex and State of New Jersey, have invented certain new and useful Improvements in Apparatus for Making Secondary-Battery Plates, of which the following is a specification.

This invention relates to apparatus designed more especially for producing the delicately-formed metal grids or conductors of electrodes used in secondary batteries or accumulators, but adapted also for making other delicate or skeleton plates producible by pressure from metal or other substance and requiring for maintenance of their shape a special forcible mechanical release from the dies or molds forming them.

The invention consists in certain novel features of construction of sectional dies used with suitable compressing appliances for shaping the delicately-formed battery grids or conductors or other plates and in auxiliary mechanism coöperating with the dies to release or eject the pressed conductor or plate, all as hereinafter described and claimed.

Reference is made to the accompanying drawings, forming part of this specification, and in which—

Figure 1:
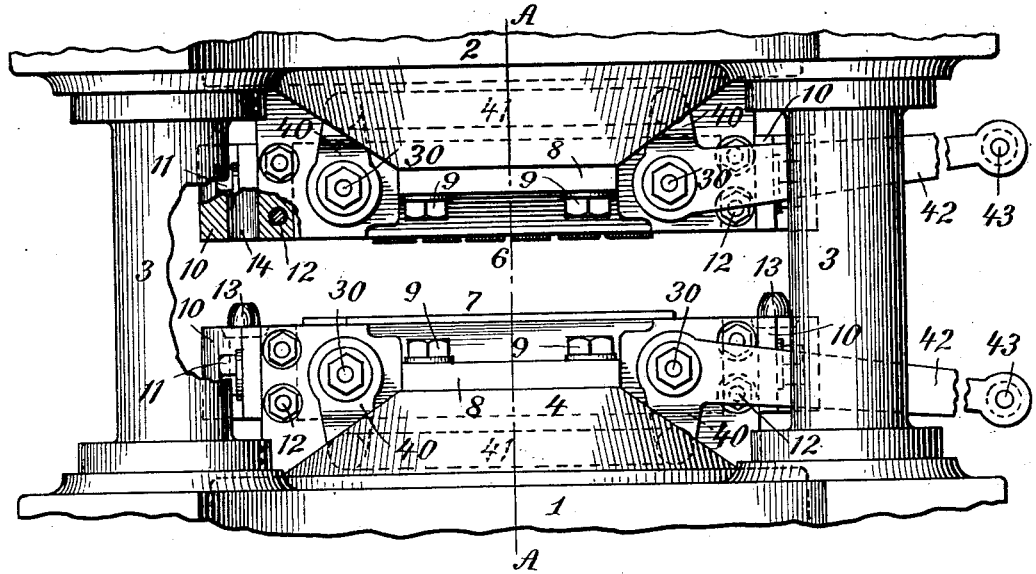
Figure 2:
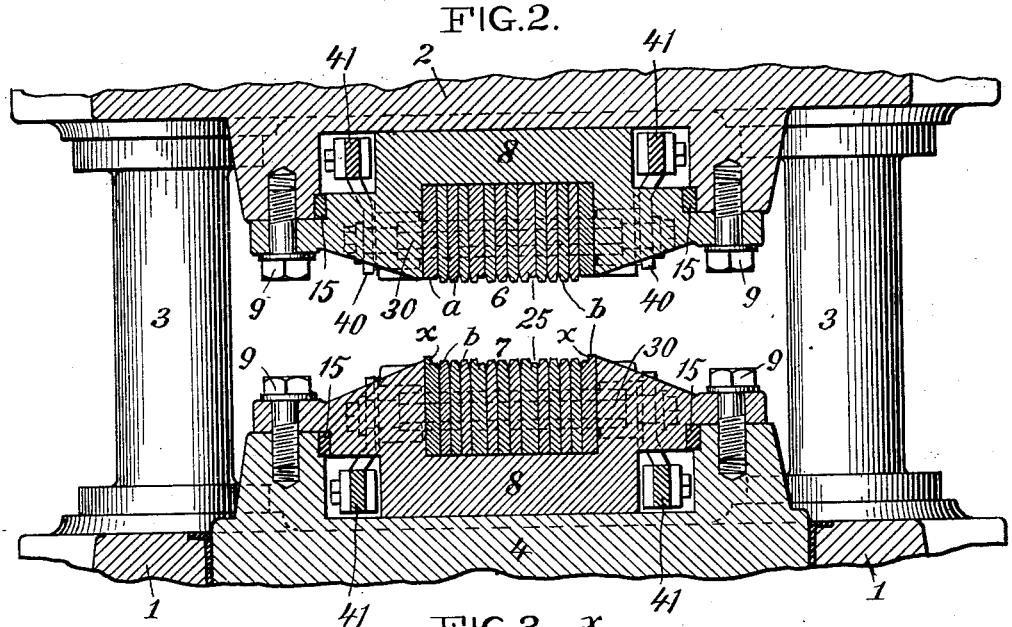
Figure 3:
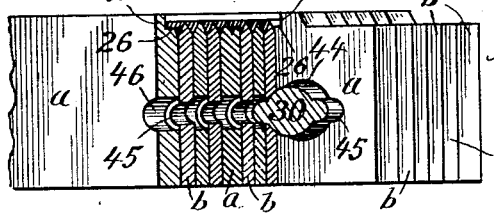

Figure 1 is a partly-sectional side elevation showing my improved battery-grid-forming dies and ejecting apparatus as adjusted to opposing platens of a hydraulic press. Fig. 2 is a transverse vertical section taken on the line A A in Fig. 1. Fig. 3 is a perspective sectional view of end portions of the lower sectional die and coöperating rocker. Fig. 4 is a plan view showing the lower sectional die and ejecting apparatus with the battery-grid on said die. Fig. 5 is an enlarged plan view of one upper corner of a preferred form of battery-plate, and Fig. 6 is a horizontal section thereof. Fig. 7 is a full-size plan view of a portion of one of the die-sections having an integral grid-partition-forming part, and Fig. 8 is a detail vertical section thereof. Fig. 9 is a full-size plan view of part of one of the die-sections not having this partition-forming portion, and Fig. 10 is a detail vertical section thereof. Fig. 11 shows in sectional side elevation the lower die-frame and die and the preferred grid-ejecting mechanism. Figs. 12 and 13 are sectional side views showing the preferred alternate facial grid-ejecting movements of the two series of die-sections by the rockers. Fig. 14 is a detail vertical transverse sectional view of one of the rockers and its operating device, and Fig. 15 is a detail sectional plan view of parts thereof. Fig. 16 shows this rocker in transverse section and in its operating device. Fig. 17 is an end view of one of the rockers; and Figs. 18 and 19 are detail transverse vertical sectional views of portions of four die-sections, clearly illustrating successive reversal of relative levels of their working faces to eject the pressed battery grid or plate.

In carrying out my invention I prefer to use a hydraulic press (partly shown in the drawings) having a base 1 and head 2, immovably connected by stanchions 3. The recessed base holds the ram 4, which is movable toward head 2, by pressure of fluid admitted below in usual manner.

In making a preferred battery-plate conductor or grid 5 (shown in Figs. 4, 5, and 6 of the drawings and more fully shown and described in my companion patent application having Serial No. 51,866) I use two opposing dies, (generally marked 6 and 7 in Figs. 1 and 2 of the drawings.) These dies are each formed in sections placed side by side and held immovable horizontally in frames 8, which are secured by bolts 9 to the press ram and head. I prefer to make the die-frame 8 with removable ends 10, held to the frame sides by longitudinal bolts 11 and preferably also by transverse bolts 12, (shown in dotted lines in Fig. 4 of the drawings.) By removing either frame end 10 any one or more of the die-sections may be renewed if overworn or broken. Guide-studs 13 in one die-frame enter holes 14 in the other die-frame to assure lateral register of the opposing dies 6 7. Hardened-steel keys 15, inserted in rabbets of the press bed and head and die-frames 8 near the bolts 9, provide for leveling or facial adjustment of the dies, while strengthening the parts against rupture by the heavy pressure of operation.

For either a "Planté" battery-plate or a plate conductor or grid having applied material to be rendered active in a secondary-battery fluid the best efficiency is obtained when the plate or grid has the largest possible area of homogeneous conductive surface in most intimate contactual relations with all portions of the active material and with the electrolyte. Difficulties have arisen in attempting to make a storage-battery plate or gird having sufficiently fine subdivision of its conductive portions while attaining that degree of efficiency, lightness, strength, and durability most desirable in portable storage batteries such as are used for electrically-propelled vehicles. The preferred battery grid or plate 5 herein referred to largely fulfils these conditions. This preferred battery grid or plate has a marginal partition 16 and inner longitudinal and transverse intersecting partitions 17 18, giving necessary strength and forming any desired number of main grid or plate sections or divisions each of which is bordered by thin tapering webs 19, which project integrally from the partitions. Each grid or plate section is preferably subdivided by quite thin longitudinal and transverse partitions 20 21 into small openings 22. Comb-like series of fine tapered fingers 23 project from the partitions and webs into the openings 22. I prefer that those portions of the ends of the fingers lying at or near an approximately central general plane of the grid or plate shall project farthest into the openings 22, the object being to give extreme conductive projection of the fingers into the very heart or center of the filling or active material which surrounds the fingers in said openings. One preferred arrow-head form of finger having such farthest projection is shown in Figs. 5 and 6 of the drawings. When the conductor or grid is not used as a Planté plate, these fingered or latticed openings 22 are filled with any suitable "Faure" material 24 to become active in a secondary-battery fluid, and shown in Fig. 5 of the drawings at lower openings of the plate portion therein illustrated. It being practically impossible to satisfactorily cast a battery grid or plate having such series of finely fingered or latticed openings bordered by quite thin partitions and webs, the mechanical difficulties involved in making such a grid or plate centered chiefly around the release of its delicate structure uninjured from dies by or between which it may be formed under heavy pressure. A prior United States Patent shows an apparatus of this general character having one sectional bed-die. A plunger forces lead into this die, and the top surplus lead is later removed by a knife, and the grid is ejected from the die by movement (derived from eccentrics) of the thin die-sections, which form the longitudinal grid-partitions toward the outer working-face level of the thicker die-sections. These thicker die-sections, which mainly form the square and fingerless recesses or openings of the grid, are not movable out of the working plane of the die, and the comparatively thin movable partition-forming die-sections are very liable to cut through or mutilate and spoil the pressed lead grid in the act of ejecting it from the die.

My present invention is sharply contradistinguished from the above-named patented apparatus in that the die-sections which shape the openings of a battery grid or plate (and especially fingered or latticed openings thereof) are facially movable beyond the working plane of the die to eject the pressed grid or plate unharmed, and I also provide for a preferred alternate outward movement of alternately-arranged series of die-sections, thereby moving practically the whole face of the die beyond its normal working plane for ejecting the pressed grid or plate with comparative ease and without buckling or cutting or otherwise injuring it. Furthermore, I am able by the fulcrumed rockers herein described to give quick hammer-blows to the die-sections to relatively move them or certain of them for ejecting the pressed grid or plate much more easily than would be possible by using slow-acting eccentrics, such as are described in the above-named prior patent. I specially mention that my invention includes any arrangement of the die-sections whereby some of them are made facially movable with respect to others, so as to reverse the relative levels of their working faces for ejecting the pressed grid or plate.

Both upper and lower sectional dies 6 7 have substantially similar construction, the only difference being that the lower die 7 has upwardly-projecting ridge portions, forming a shoulder $x$ in the hard and durable steel of the die-sections about as deep as the thickness of the marginal partition 16 of the grid or plate 5. This shoulder corresponds with the marginal form of both the blank and the finished grid or plate and makes a guide for properly placing the blank between the dies. This steel shoulder $x$ also safely withstands outward or lateral pressure during forming of the grid or plate, and therefore prevents outward marginal or lateral expansion of the metal of the blank or plate as it is being shaped by the opposing sectional dies, thus assuring compression of the entire grid or plate to practically perfect a uniform homogeneity throughout its whole structure. The grid or plate ejecting mechanism is substantially similar in both upper and lower dies. It therefore will suffice to give a detailed description of but one of the sectional dies and the preferred devices for reversing the facial levels of the alternating die-sections for ejecting the pressed grid or plate. I so describe the lower sectional die 7 and its ejector devices as follows:

I may prefer to fasten separately-formed thin die-sections, which shape the longitudinal grid or plate partitions 17, to the adjoining sections of the die to be movable therewith for ejecting purposes. These partition-forming die portions are indicated at 25, more especially in Figs. 7 and 8 of the drawings. The outside marginal partitions 16 of the grid or plate are produced by portions 26 of the die-sections coöperating with the marginal shoulder x above mentioned. The transverse grid or plate partitions 18 are produced by die portions 27. The thin tapering webs 19 and the thin tapered longitudinal partitions 20 and the transverse partitions 21 are formed by die depressions 28, and the fingers 23 within the grid-openings 22 are formed by depressions 29 of the die-sections. The dies may be cut to produce projections or fingers of any desired form in the grid or plate openings.

The preferred grid or plate ejecting means herein shown comprises a two-series alternating arrangement of the die-sections with auxiliary actuating mechanism whereby each of the two alternating series of die-sections are facially and successively moved beyond the working plane of the die, so that each movable series of die-sections strips or releases the compressed grid or plate from the other movable series of die-sections. The preferred arrangement and mode of operation are specially adapted for release or ejection of the above-described delicately-formed grid or plate having the finely fingered or latticed openings. It will be understood that for the purposes of this invention movement of but one series of die-sections will suffice for ejecting the compressed grid or plate. I describe the preferred two-series arrangement of die-sections and auxiliary mechanism, as follows:

To make the battery grid or plate 5, I use two opposing dies, each preferably having fourteen sections arranged in two alternating series, respectively marked a and b in Figs. 2, 3, 12, 13, 18, and 19 of the drawings. For facially moving the die-sections to eject the grid or plate I preferably employ what I herein term "rockers," generally marked 30 in the drawings. I prefer to use two rockers for each sectional die and to pass them through peculiarly-formed transverse openings made near the ends of the die-sections and presently described. Both rockers have like form, and in a preferred cross-section show opposite rounded-edge portions 31 32 merging into enlarged top and bottom rounded central portion 33. Said parts 31 32 33 pass through the openings of die-sections a b and also into openings 34, which extend some little distance—say about three-quarters of an inch—into round hub-bearings 35, fitted to turn in the die-frame 8. At opposite ends each rocker has a round bearing 36 normally fitting the sides and bottom of vertically-elongated openings 37 in the hubs 35, thus giving a top clearance, as shown in Fig. 14, which view and Fig. 16 together show that the hub-openings 34 also are enlarged to give like clearance over parts 31 32 33 of the rockers. This construction allows the hubs 35 to turn freely in the die-frame 8, while causing and permitting upward bodily-tilting movement of the rockers in the clearance-spaces for facially moving the die-sections. A washer 38 and nut 39 hold the hub 35 loosely in place in the die-frame 8. The hubs 35 preferably have projecting arms 40, and at each side of the die-frame these arms are shown coupled by a link 41. To the hubs 35 of the front rocker are fixed arms or levers 42, which are preferably connected at outer ends by a cross-bar 43, which when vertically reciprocated operates both rockers 30 in unison. The arms 40 project downward at lower die 7 and upward at upper die 6.

The transverse openings 44 through all the die-sections have central portions larger than the parts 33 of the tilting rockers to give them play and permit outward movement of the die-sections. The chief peculiarity of these openings 44 consists in providing them at one end with vertically-short recesses 45 and at the other end with vertically-longer recesses 46. Said openings are reversed in position in alternate die-sections—that is to say, the short recesses 45 of one die-section are at the front and the short recesses of the next section are at the rear. This alternately-reversed arrangement of the recesses 45 46 is clearly indicated in Figs. 3, 12, and 13 of the drawings. The short recesses 45 afford fulcrums for the rockers, and the longer recesses 46 give clearance for the rockers and the moving die-sections. The extent of outward movement of the two series of die-sections is exaggerated in Figs. 12 and 13 for better illustration. In practice the movement need be very slight beyond the normal working plane or level of the die-sections.

The operation of my invention is as follows: A sheet or blank of lead which had been rolled or molded and about one-eighth of an inch in thickness is placed on the bed-die 7, and the press-ram 4 then is hydraulically raised to close the opposing dies 6 7 upon the metal blank, and thereby give the battery grid or plate the general form indicated in Figs. 4, 5, and 6 of the drawings. The plate or grid margin 16 and partitions 17 18 retain original thickness of the lead sheet or blank; but the lighter webs 19 and partitions 20 21 and the bases of the fingers 23 are raised equally at both faces of parts 16 17 18 to have an edge-to-edge width of about one-quarter to five-sixteenths of an inch, which therefore is the over-all thickness of the grid or plate and of its fillings 24, should they be used in the grid-openings. The fluid-pressure on ram 4 now is eased and simultaneously the lever 42 43 of upper die 6 is vertically reciprocated thereby, successively moving the faces of alternating series of die-sections a b beyond the working plane of die 6, thus loosening and ejecting the compressed grid or plate from this die. When ram 4 is lowered or during lowering of it, the grid or plate is likewise loosened or ejected from the lower die 7 by vertically reciprocating the lever 42 43 at the lower die-frame. The grid or plate now may be removed, unbuckled, and unharmed from the press. Thin fins usually left at a central plane of the pressed structure will ordinarily be cut away to leave clear openings 22 around the fingers 23.

When all the sections of dies 6 7 are at normal working level, they rest at the bases of their frames 8, and the short recesses 45 of die-section openings 44 range about centrally with the alternating longer recesses 46 of the adjoining die-sections, and the longer centers of the rockers are about in horizontal plane and the centers of rocker-hubs 35 and of the pivots connecting the arms 40 with the links 41 range about in vertical plane and as will be understood from Figs. 1, 3, 4, and 16 of the drawings. As the lever 42 43—say of lower die 7—is moved downward from normal position it swings arms 40 and links 41 rearward, as indicated by dotted lines in Fig. 12. During such movement lower shoulders of hub-bearing openings 34 lift the rear edges 32 of rockers 30. This causes the rockers now fulcrumed by their front edges 31 in the short recesses 45 of die-sections $a$ to outwardly move all the die-sections $b$, as in Fig. 12, by hammer-blow action of rocker edges 32 in the short rear recesses 45 of said sections $b$, and meanwhile the longer rear recesses 46 of sections $a$ permit upward movement of the rocker edges 32, and the longer front recesses 46 of the moving sections $b$ slide along the relatively stationary fulcruming edges 31 of the rockers, thus giving clearance to both the rockers and the moving die-sections. When the lever 42 43 is moved upward from normal position, the arms 40 and links 41 swing forward, as indicated by dotted lines in Fig. 13, thus causing the shoulders of hub-openings 34 to lift the front edges 31 of rockers 30 by hammer-blow action, while the rockers fulcrum by their rear edges 32 in the short recesses 45 of all the die-sections $b$. These sections $b$ remain at rest while the rocker edges 31 move all the die-sections $a$ outward, as in Fig. 13. The longer front recesses 46 of the stationary sections $b$ permit upward movement of the rocker edges 31, while the longer recesses 46 of the moving die-sections $a$ slide along the relatively stationary fulcruming edges 32 of the rockers, thus again giving clearance to both rockers and die-sections. It thus will appear that should the die-sections $b$ first be facially moved beyond the normal working plane of the die they will push or strip the pressed grid or plate 5 from the alternating die-sections $a$, and the later movement of sections $a$ beyond normal working plane in turn pushes or strips the grid or plate from the die-sections $b$. Thus without buckling or other injury may be stripped or ejected from the dies the most delicately or intricately formed grid or plate structure it is possible for them to produce.

Figs. 18 and 19 of the drawings clearly illustrate the successive reversal of levels of the die-section faces for ejecting the pressed grid or plate. In Fig. 18 the die-sections $a$ are moved facially beyond the facial level of die-sections $b$, and in Fig. 19 the die-sections $b$ are moved facially beyond the facial level of die-sections $a$, as when both series of die-sections $a$ $b$ are alternately moved in the preferred manner. It is obvious, however, that this same reversal of facial levels of the die-sections for ejecting the pressed plate may be effected by movement of but one series of die-sections—say the sections $a$—first above the level of die-sections $b$, as in Fig. 18, and then below the level of die-sections $b$, as in Fig. 19 of the drawings.

By this apparatus I am able to make a battery grid or plate having very delicate structure giving maximum conductivity with minimum weight. Furthermore, all parts of the grid or plate are homogeneously compressed, thus giving practically uniform conductivity throughout the entire electrode and especially to all parts of filling material which may be used in the finely fingered or latticed openings of the grid or conductor. There are no blow-holes or other physical or mechanical imperfections in the grid or plate, nor is there incorporation therein of damaging impurities, such as attend the casting of skeleton battery grids or plates intended to receive filling material or as occurs while casting conductive lead plates or frames around pastiles already formed, as commonly is done.

I claim as my invention—

1. In apparatus of the character described, a die made in sections movable so as successively to reverse their relative facial levels to eject the pressed grid or plate.

2. In apparatus of the character described, a die made in parallel sections movable so as successively to reverse their relative facial levels to eject the pressed grid or plate.

3. In apparatus of the character described, a die made in sections arranged for ejection of the pressed grid or plate by successive relative adjustments of the facial levels of some sections above and below the facial levels of other sections.

4. In apparatus of the character described, a die made in parallel sections arranged for ejection of the pressed grid or plate by successive relative adjustments of the facial levels of some sections above and below the facial levels of other sections.

5. In apparatus of the character described, a die made in sections adapted to impress recesses or openings of a grid or plate, some of said sections being movable with respect to others so as successively to reverse their relative facial levels to eject the pressed grid or plate.

6. In apparatus of the character described, a die made in sections adapted to impress fingered or latticed recesses or openings of a grid or plate, some of said die-sections being movable with respect to others so as successively to reverse their relative facial levels to eject the pressed grid or plate.

7. In apparatus of the character described, a die made in sections and movable at its entire working face to eject the pressed grid or plate.

8. In apparatus of the character described, a die made in sections placed side by side and movable at its entire working face to eject the pressed grid or plate.

9. In apparatus of the character described, a die made in adjoining sections having transverse openings, rockers entering said openings, and means tilting the rockers and thereby facially moving the die-sections and ejecting the pressed grid or plate.

10. In apparatus of the character described, a die made in adjoining sections arranged in two alternating series, each series of die-sections being facially movable relatively to the other series, thereby ejecting the pressed grid or plate by movement of the entire working face of the die.

11. In apparatus of the character described, a die made in adjoining sections having transverse openings and arranged in two alternating series, each series of die-sections being movable relatively to the other series, rockers entering said die-section openings, and means tilting the rockers outward at opposite edges thereby facially and alternately moving the two series of die-sections and ejecting the pressed grid or plate.

12. In apparatus of the character described, a die made in adjoining sections together adapted to compress a grid or plate having marginal portions or marginal and partition portions with intervening recesses or openings; the die-sections forming said recesses or openings being facially movable beyond the working plane of the die, and means so moving said die-sections.

13. In apparatus of the character described, a die made in adjoining sections having transverse openings and together adapted to compress a grid or plate having marginal portions or marginal and partition portions with intervening recesses or openings, rockers entering the transverse openings of the die-sections, and means tilting said rockers and thereby facially moving those die-sections forming the plate recesses or openings beyond the working plane of the die and ejecting the compressed grid or plate.

14. In apparatus of the character described, a die made in adjoining sections together adapted to compress a grid or plate having marginal portions or marginal and partition portions and intervening fingered or latticed portions, the die-sections forming said fingered or latticed plate portions being facially movable beyond the working plane of the die, and means so moving said die-sections.

15. In apparatus of the character described, a die made in adjoining sections having transverse openings and together adapted to compress a grid or plate having marginal portions or marginal and partition portions and intervening fingered or latticed portions, rockers entering the transverse openings of the die-sections, and means tilting said rockers and thereby facially moving those die-sections forming the fingered or latticed plate portions beyond the working plane of the die and ejecting the compressed grid or plate.

16. In apparatus of the character described, a die made in adjoining sections together adapted to compress a grid or plate having marginal portions or marginal and partition portions with intervening recesses or openings, the die-sections forming said recesses or openings being arranged in two alternating series alternately movable facially beyond the working plane of the die, and means so moving the two series of die-sections.

17. In apparatus of the character described, a die made in adjoining sections having transverse openings and together adapted to compress a grid or plate having marginal portions or marginal and partition portions with intervening recesses or openings, the die-sections forming said recesses or openings being arranged in two alternating and alternately-movable series, rockers entering the transverse openings of said die-sections, and means tilting the rockers outward at opposite edges thereby outwardly and alternately moving the two series of die-sections and ejecting the compressed grid or plate.

18. In apparatus of the character described, a die made in adjoining sections together adapted to compress a grid or plate having marginal portions or marginal and partition portions and intervening fingered or latticed portions, the die-sections forming said fingered or latticed portions being arranged in two alternating series alternately movable facially beyond the working plane of the die, and means so moving the two series of die-sections.

19. In apparatus of the character described, a die made in adjoining sections having transverse openings and together adapted to compress a grid or plate having marginal portions or marginal and partition portions and intervening fingered or latticed portions, the die-sections forming said fingered or latticed plate portions being arranged in two alternating and alternately-movable series, rockers entering the transverse openings of said die-sections, and means tilting the rockers outward at opposite edges thereby outwardly and alternately moving the two series of die-sections and ejecting the compressed grid or plate.

20. In apparatus of the character described, a die made in sections having transverse openings formed with short and longer recesses and reversely arranged in alternating die-sections, combined with a rocker movable in said die-section openings and fulcruming in the short recesses of one series of relatively stationary die-sections while acting in the short recesses of the other series of die-sections thereby moving the latter sections facially beyond the working plane of the die, the longer recesses of the die-section openings giving clearance for the rocker and moving die-sections, and means actuating the rocker.

21. In apparatus of the character described, a die made in sections having transverse openings formed with short and longer recesses and reversely arranged in alternating die-sections, combined with a rocker movable in said die-section openings and fulcruming in the short recesses of one series of relatively stationary die-sections while acting in the short recesses of the other series of die-sections thereby moving said latter sections facially beyond the working plane of the die, the longer recesses of the die-section openings giving clearance for the rocker and moving die-sections, hub-bearings adapted to turn at the die-frame and having openings supporting and tilting the rocker and giving clearance therefor, and lever connections to said hub-bearings actuating them and the rocker.

22. In apparatus of the character described, a die made in sections each having two transverse openings formed with short and longer recesses and reversely arranged in alternating die-sections, combined with two rockers movable in said die-section openings, each rocker fulcruming in the short recesses of one series of relatively stationary die-sections while acting in the short recesses of the other series of die-sections thereby moving the latter sections at their whole face area beyond the working plane of the die, the longer recesses of the die-section openings giving clearance for the rockers and moving die-sections, and means simultaneously actuating both rockers.

23. In apparatus of the character described, a die made in sections each having two transverse openings formed with short and longer recesses and reversely arranged in alternating die-sections, combined with two rockers movable in said die-section openings, each rocker fulcruming in the short recesses of one series of relatively stationary die-sections while acting in the short recesses of the other series of die-sections thereby moving said latter sections at their whole face area beyond the working plane of the die, the longer recesses of the die-section openings giving clearance for the rockers and moving die-sections, hub-bearings for each rocker adapted to turn at the die-frame and having openings supporting and tilting the rockers and giving clearance therefor, means coupling the rocker-actuating hubs in pairs at the sides of the die-frame, and lever connections simultaneously actuating the hub-bearings and rockers.

24. In apparatus of the character described, a die made in sections having transverse openings formed with short and longer recesses and reversely arranged in alternating die-sections, said sections being arranged in two alternating series each series movable relatively to the other series, combined with rockers adapted to tilt outwardly at both edges in the transverse openings of the die-sections and fulcruming in the short recesses of one series of relatively stationary die-sections while acting in the short recesses of the other series of die-sections thereby facially moving either alternating series of die-sections beyond the working plane of the die, the longer recesses of the die-section openings giving clearance for the rockers and moving die-sections, and means actuating the rockers.

25. In apparatus of the character described, a die made in sections having transverse openings formed with short and longer recesses and reversely arranged in alternating die-sections, said die-sections being arranged in two alternating series each series movable relatively to the other series, combined with rockers adapted to tilt outwardly at both edges in the transverse openings of the die-sections and fulcruming in the short recesses of one series of relatively stationary die-sections while acting in the short recesses of the other series of die-sections thereby facially moving either alternating series of die-sections beyond the working plane of the die, the longer recesses of the die-section openings giving clearance for the rockers and moving die-sections, hub-bearings for the rockers adapted to turn at the die-frame and having openings supporting and tilting the rockers and giving clearance therefor, means coupling the rocker-actuating hubs in pairs at the sides of the die-frame, and lever connections simultaneously actuating said hub-bearings and rockers.

26. In apparatus of the character described, a die comprising adjoining sections together adapted to compress a grid or plate having one or more strengthening-partitions ranging about parallel with the die-sections, those portions of the die forming said partitions being made integral with die-sections which also compress adjacent portions of the grid or plate.

27. In apparatus of the character described, a die comprising adjoining sections some or all of which are facially movable outward and together adapted to compress a grid or plate having one or more strengthening-partitions ranging about parallel with the die-sections, those portions of the die forming said partitions being made integral with facially-movable die-sections which also compress adjacent portions of the grid or plate.

28. In apparatus of the character described, the combination, with compressing mechanism, of two opposing dies fitted therein and adapted to form a grid or plate between them, said dies each being made in adjoining sections some or all of which are movable at their working face to eject the compressed grid or plate.

29. In apparatus of the character described, the combination, with compressing mechanism, of two opposing sectional dies fitted therein and adapted to form a grid or plate between them; some of the sections of each die being movable with respect to others so as successively to reverse their relative facial levels to eject the compressed grid or plate from each of the two dies.

30. In apparatus of the character described, the combination, with compressing mechanism, of two opposing sectional dies fitted therein and adapted to form between them a grid or plate having recesses or openings, some of the sections of each die forming said recesses or openings being movable with respect to others so as successively to reverse their relative facial levels to eject the compressed grid or plate from each of the two dies.

31. In apparatus of the character described, the combination, with compressing mechanism, of two opposing sectional dies fitted therein and adapted to form between them a grid or plate having fingered or latticed recesses or openings; some of the sections of each die forming said fingered or latticed recesses or openings being movable with respect to others so as successively to reverse their relative facial levels to eject the compressed grid or plate from each of the two dies.

32. In apparatus of the character described, the combination, with compressing mechanism, of two opposing dies fitted therein and adapted to form a grid or plate between them, said dies each being made in adjoining sections having transverse openings, rockers entering said openings, and means tilting the rockers and thereby moving the die-sections and ejecting the compressed grid or plate.

33. In apparatus of the character described, the combination, with compressing mechanism, of two opposing dies fitted therein and adapted to form a grid or plate between them, said dies each being made in adjoining sections arranged in two alternating series, each series of die-sections being facially movable relatively to the other series thereby ejecting the compressed grid or plate by movement of the entire working face of the die, and means so alternately moving the serial sections of each die.

34. In an apparatus of the character described, the combination, with compressing mechanism, of two opposing dies fitted therein and adapted to form a grid or plate between them, said dies each being made in adjoining sections having transverse openings and arranged in two alternating series, each series of die-sections being facially movable relatively to the other series, rockers entering said die-section openings, and means tilting the rockers outward at opposite edges thereby facially and alternately moving the two series of sections of each die and ejecting the compressed grid or plate.

35. In apparatus of the character described, a die made in adjoining sections together adapted to compress a grid or plate having one or more main divisions and marginal webs surrounding them, intermediate partitions subdividing said main divisions into smaller openings, and fingers projecting into said smaller openings from the partitions and webs; said die-sections being movable so as successively to reverse their relative facial levels to eject the pressed grid or plate.

36. In apparatus of the character described, the combination, with compressing mechanism, of two opposing sectional dies fitted therein and adapted to form between them a grid or plate having one or more main divisions and projecting marginal webs surrounding them, intermediate partitions subdividing said main divisions into smaller openings, and fingers projecting into said smaller openings from the partitions and webs; said die-sections being movable so as successively to reverse their relative facial levels to eject the pressed grid or plate.

37. In apparatus of the character described, a die or mold made in sections disposed side by side and relatively movable to eject the compressed grid or plate, said die-sections having ridge portions forming a shoulder corresponding to the marginal contour of the grid or plate and preventing lateral expansion of the material of the grid or plate during the compressing operation.

ALBERT FRANKLIN MADDEN.

Witnesses:
ARTHUR L. STEVENS,
ALBERT J. DOTY.